United States Patent
Nakamura (10) Patent No.: US 6,337,951 B1
(45) Date of Patent: Jan. 8, 2002

(54) CAMERA AND PHOTO DATA INPUT SYSTEM FOR CAMERA

(75) Inventor: Hiroaki Nakamura, Kanagawa (JP)

(73) Assignee: Fuji Photo Film Co., Ltd., Kanagawa (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/975,665

(22) Filed: Nov. 21, 1997

(30) Foreign Application Priority Data

Dec. 2, 1996 (JP) .............................................. 8-321616

(51) Int. Cl.[7] ......................... G03B 17/00; G03B 17/24; H04N 5/76
(52) U.S. Cl. ......................... 396/57; 396/312; 396/319; 348/232
(58) Field of Search ..................... 396/57, 319, 320, 396/312; 398/231–232

(56) References Cited

U.S. PATENT DOCUMENTS

| | | | | |
|---|---|---|---|---|
| 4,163,123 A | * | 7/1979 | Brodsky et al. | 250/199 |
| 5,152,003 A | * | 9/1992 | Poch | 455/18 |
| 5,161,250 A | * | 11/1992 | Ianna et al. | 455/66 |
| 5,212,831 A | * | 5/1993 | Chuang et al. | 455/54.1 |
| 5,267,042 A | * | 11/1993 | Tsuchiya et al. | 396/57 |
| 5,276,472 A | * | 1/1994 | Bell et al. | 396/312 |
| 5,296,884 A | * | 3/1994 | Honda et al. | 396/319 |
| 5,335,072 A | * | 8/1994 | Tanaka et al. | 348/232 |
| 5,479,228 A | * | 12/1995 | Tamamura et al. | 396/317 |
| 5,506,644 A | * | 4/1996 | Suzuki et al. | 396/319 |
| 5,588,020 A | * | 12/1996 | Schilling | 370/337 |
| 5,768,633 A | * | 6/1998 | Allen et al. | 396/2 |
| 5,768,640 A | * | 6/1998 | Takahashi et al. | 396/310 |
| 5,873,026 A | * | 2/1999 | Reames | 455/66 |
| 5,913,078 A | * | 6/1999 | Kimura et al. | 396/50 |

OTHER PUBLICATIONS

QT Optoelectronics specification sheets for T–1 and Metal can IR diodes, Dec. 1997.*

Mims III, Forest M., 103 Projects for Electronics Experimenters, by Tab Books, Inc., p. 267, Jun. 1981.*

* cited by examiner

*Primary Examiner*—Christopher E. Mahoney
(74) *Attorney, Agent, or Firm*—Sughrue Mion, PLLC (57) ABSTRACT

A data sender is installed in a designated place where the probability of photography is high. The data sender sends out photo data relating to the designated place. A receiver for receiving photo data from the data sender and a data storage device for storing the photo data are incorporated into a camera. In association with an image photographed by the camera at the designated place, the photo data is written in the data storage device. The photo data is used for printing or displaying literal information about a scene or subject of the photographed image.

23 Claims, 7 Drawing Sheets

CAMERA AND PHOTO DATA INPUT SYSTEM FOR CAMERA

BACKGROUND OF THE INVENTION

1. Field of the Invention

The present invention relates to a camera and a photo data input system which facilitates inputting photo data in a data storage device attached to the camera.

2. Background Arts

A new type of photo film cartridge, called IX 240, contains a filmstrip with a transparent magnetic recording layer to record data thereon. In addition, the IX 240 film cartridge can contain the entire filmstrip and advance the leader of the filmstrip out of the cartridge shell by rotating the spool in an unwinding direction. Therefore, the filmstrip can be repeatedly withdrawn from and rewound into the cartridge shell, which allows a magnetic head to write or read the photo data on the magnetic recording layer while the filmstrip is being advanced or rewound.

To make the best use of the IX 240 film cartridge, cameras for the IX 240 type often have a data recording device with a magnetic head for automatically recording photo condition data, such as exposure value data, subject distance data, and illumination light source data, on the magnetic recording layer in association with each image frame. The photo condition data is utilized for controlling printing conditions to obtain the best quality of print. Some of the IX 240 cameras can record print format data or clopping data for designating a print format to each image frame. It is also known in the art to record literal information about the scene or subject, such as a title or a memo, as digital data on a data storage device, such as an IC memory.

Conventionally, several words and phrases, e.g. "Happy Birthday!", are registered in a memory of the camera as options the photographer can record as literal information about the scene. Because of the memory capacity, it is hard to register a wide variety of options enough for the variety of actual scenes. Moreover, it takes a certain time prior to photographing a scene to make a selection among the registered words. For wider variety, it is possible to manually enter words for each scene by operating character keys or the like of the camera. But this solution is still more time consuming.

SUMMARY OF THE INVENTION

In view of the foregoing, a prime object of the present invention is to provide a camera and a photo data input system for the camera which faciliates recording photo data, especially information about scenes, in association with each frame photographed by the camera.

To achieve the above and other objects, a camera of the present invention is comprised of a receiver for receiving photo data sent from a remote data sender installed in a designated place; and a memory for storing the photo data in association with an image photographed at the designated place.

A photo data input system of the present invention is comprised of a data sender which is installed in a designated place, such as a place where photographs are often taken, and a camera which is provided with a receiver for receiving photo data sent from the data sender, a memory for storing the photo data in association with an image photographed at the designated place.

The photo data from the data sender includes scene data, the scene data contains literal or audio information about the scene or subject to be photographed at the place the data sender is installed. The photo data written in the memory is preferably recorded on a data storage device which is readable by an external device, such as a printer. When the present invention is applied to an IX 240 type camera, the photo data is recorded on the magnetic recording layer of the filmstrip in association with each frame.

According to another preferred embodiment, a photo data input system is comprised of a data sender installed in a designated place for sending out place ID data for identifying the designated place; a receiver for receiving the place ID data from the data sender; a memory previously storing photo data relating to predetermined different places; and a data read-write device for selecting one of the previously stored photo data in accordance with the place ID data and recording the selected photo data on a data storage device in association with an image photographed by a camera at the designated place. The memory and the data read-write device may be incorporated into the camera, or may be connectable to the camera.

According to another preferred embodiment, a photo data input system is comprised of a data sender installed in a designated place for sending out place ID data for identifying the designated place; a camera provided with a receiver for receiving the place ID data from the data sender, and a data recording device for recording the place ID data in a first memory in association with an image photographed by the camera at the designated place; a second memory previously storing various photo data relating to predetermined different places; and a data read-write device connected to the second memory and connectable to the first memory for reading the place ID data from the first memory to select one of the previously stored photo data from the second memory in accordance with the place ID data, the data read-write device recording the selected photo data on a data storage device in association with the image photographed at the designated place.

In this way, scene data specific to each scene is recorded in association with each photographic image without the need for manual operation to enter the photo data in the camera.

BRIEF DESCRIPTION OF THE DRAWINGS

The above and other objects and advantages of the present invention will become apparent from the following detailed description of the preferred embodiments when read in connection with the accompanying drawings, which are given by way of illustration only and thus are not limitative of the present invention, wherein like reference numerals designate like or corresponding parts throughout the several views, and wherein.

DETAILED DESCRIPTION OF THE PREFERRED EMBODIMENT

Figure 1:
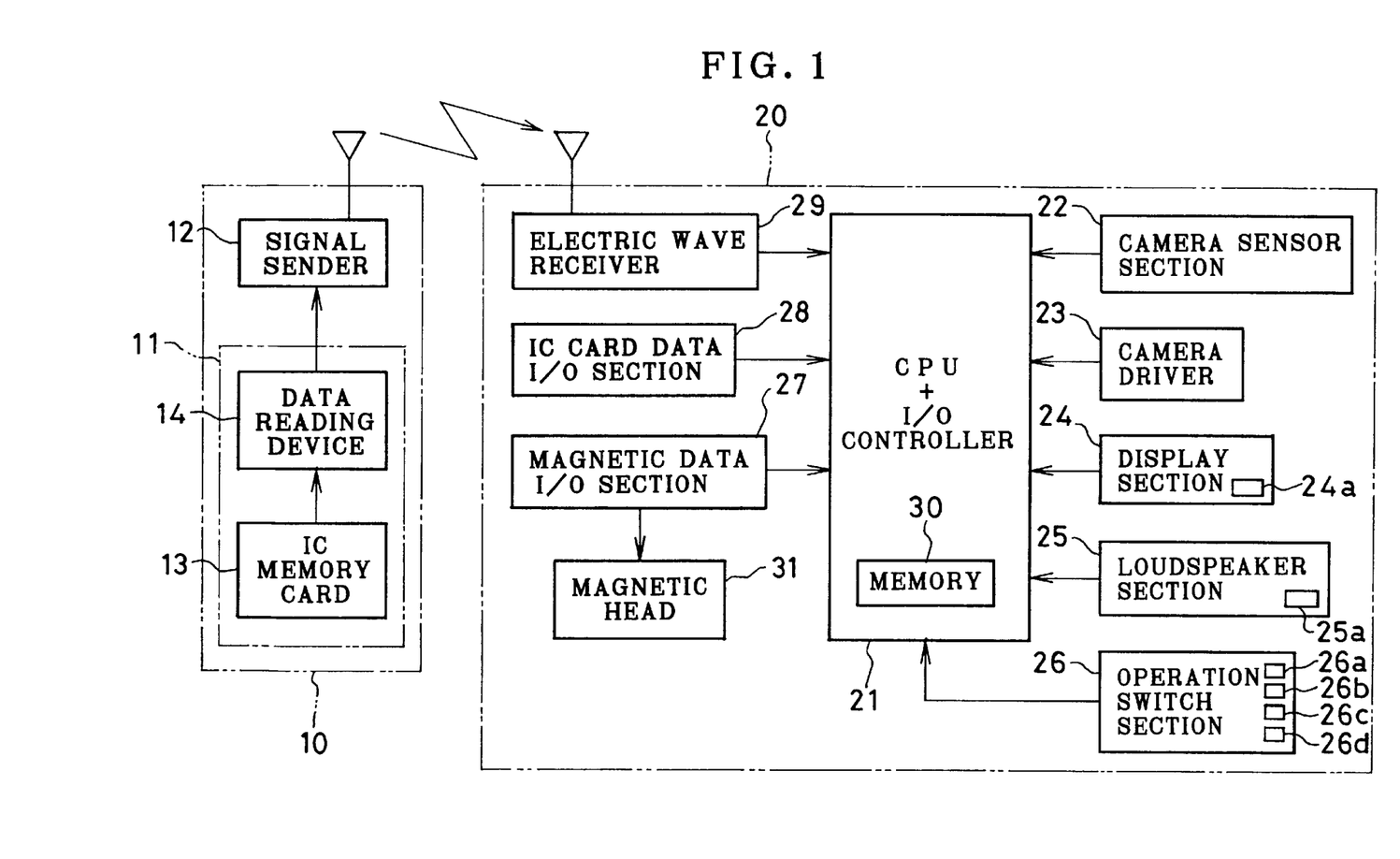
FIG. 1 is a block diagram of a photographic data input system for a camera according to an embodiment of the invention.

FIG. 1 shows a photo data input system according to an embodiment of the present invention, wherein a data sender 10 is installed in a place where people are likely to take photographs, for example, in front of each individual cage in 10 a zoo. The data sender 10 includes a data memory 11 and a signal sender 12. The data memory 11 consists of an IC memory card 13 and a data reading device 14.

Figure 2:
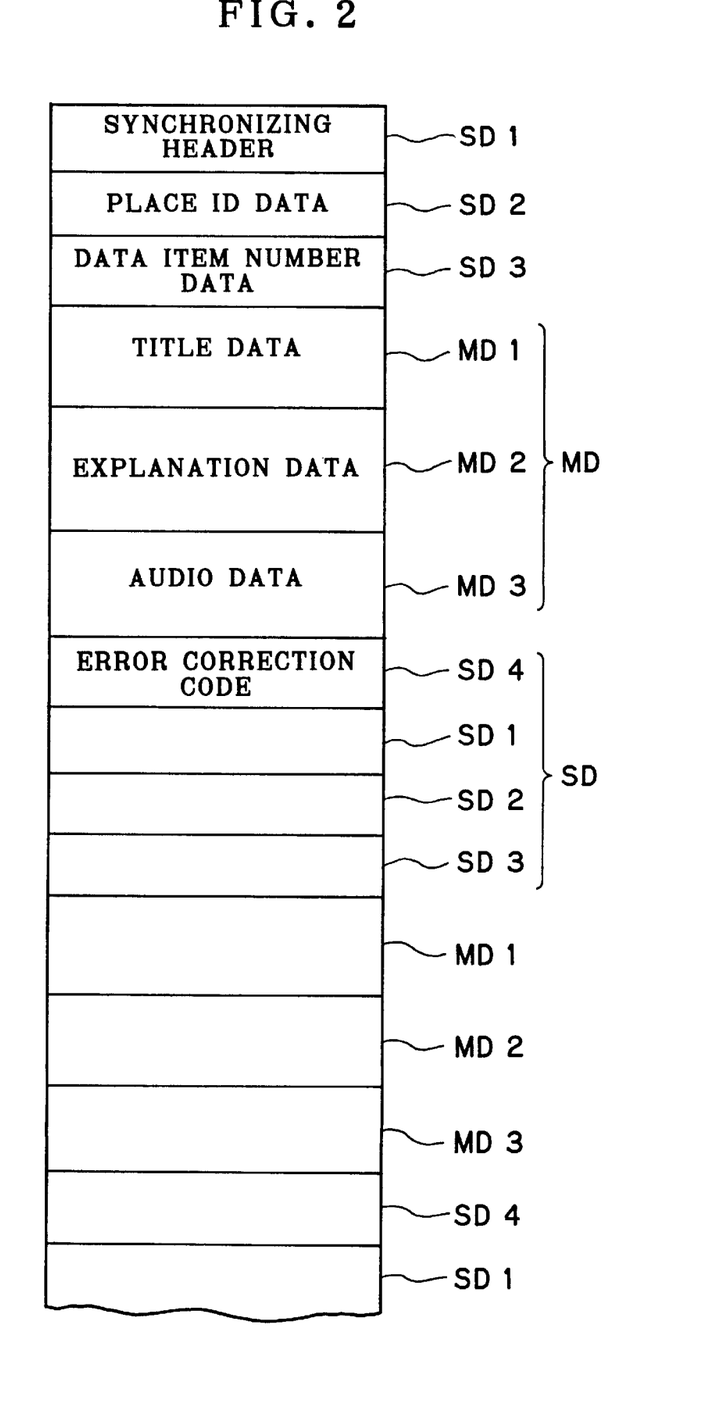
FIG. 2 is an explanatory view illustrating a scene data construction sent from a data sender.

Referring to FIG. 2 the IC memory card 13 stores scene data which is previously written through a well-known computer, such as a personal computer. The scene data consists of main data MD including title data MD1, explanation data MD2 and audio data MD3, and supplemental data SD including synchronizing header SD1, place ID data SD2, data item number data SD3 and error correction code SD4.

The signal sender 12 is an ordinary FM radio sender having a power of several to several tens milli-watts. The signal sender 12 sequentially sends out the various data items read out from the IC memory card 13 as an FM modulated data signal. As shown in FIG. 2, the scene data is sent as a data block containing the da a items in the predetermined sequence, and the same data sender 10 sends out the same data block repeatedly. The data sender 10 is sufficiently spaced from other data senders 10 to avoid interference between FM data signal; sent from these data senders 10.

The title data MD1 contains a title relating to a subject mainly photographed at the place where the data sensor 10 is installed. For example, when the data sensor 10 is installed in front of a lion cage, the title data MD1 written in the IC card 13 contains a title "A Lion Named TARO". The explanation data MD2 contains an explanation relating to the subject. As for the lion, TARO, the explanation may be his age, weight and other records about him. The audio data MD3 contains a record of the subject's sound. In this example, the audio data MD3 may be the record of his roar.

The synchronizing header data SD1 is to head the data block. The place where ID data SD2 is to identify the place the photo subject exists. The data item number data SD3 is used for selecting those data items to record among the various data items included in the scene data, in a manner as set forth later. The error correction code SD4 is to correct sending errors if any.

A camera 20 is of IX 240 type, wherein a control chip 21 having a CPU and an I/O controller integrated therein in a well-known manner is connected to a camera sensor section 22, a camera drive section 23, a display section 24, a loudspeaker section 25, an operation switch section 26, a magnetic data I/O section 27, an IC card data I/O section 28, and an electric wave receiver 29. Aside from the electric wave receiver 29, the camera 20 has the same fundamental constructions as a conventional IX 240 type camera, including an auto exposure control (AE) section, an auto focusing (AF) section, a film winding-rewinding section, a magnetic recording section and a shutter control section. Therefore, the description of these fundamental constructions is omitted for brevity.

The electric wave receiver 29 receives the FM data signal from the data sender 10, and the scene data extracted from the FM data signal is written in a memory 30 in the control chip 21. The CPU integrated in the control chip 21 processes the main data MD, and write it on transparent magnetic recording layer provided on an IX 240 type filmstrip loaded in the camera 20.

The camera 20 is provided with three data pick-up modes, including a synchronous data pick-up mode, a manual data pick-up mode and an automatic data pick-up mode, one of which is selected in an initial setup operation. The CPU processes and records the main data MD in accordance with the selected data pick-up mode.

Figure 3:
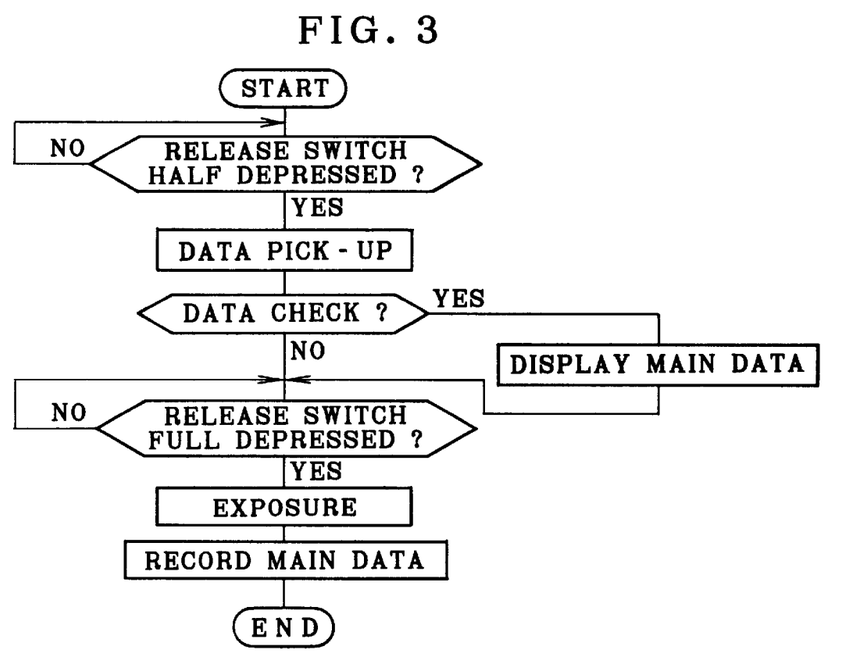
FIG. 3 is a flow chart illustrating a sequence for a synchronous data pick-up mode.

When the synchronous data pick-up mode is selected, the CPU processes and records the main data MD according to a sequence shown in FIG. 3. Upon a half depression of a release switch 26a, the CPU starts picking up the scene data that is sent from the data sender 10, and writes it in the memory 30. If the release switch 26a is fully depressed, an exposure is made. Thereafter while the filmstrip is advanced one frame, the picked up main data MD is recorded in addition to other photo data, such as frame number and exposure correction data, on the magnetic recording layer of the filmstrip through the magnetic data I/O section 27 and a magnetic head 31.

Even if the photographer removes the finger off the release switch 26a without fully depressing it, the CPU continues to pick up the scene data. When the photographer wants to check the main data MD written in the memory 30, the photographer depresses a data checking switch 26b after the half depression of the release switch 26a. Then, the contents of the picked up main data MD are displayed on a screen 24a of the display section 24. If the main data MD includes the audio data MD3, corresponding information is displayed on the screen 24a. When an audio data checking switch 26c is operated then, the sound recorded as the audio data MD3 is reproduced through a loudspeaker 25a of the loudspeaker section 25.

If necessary, the photographer can eliminate those data items which are not to be recorded to record by designating the number of the data item to eliminate while the main data MD is displayed.

Figure 4:
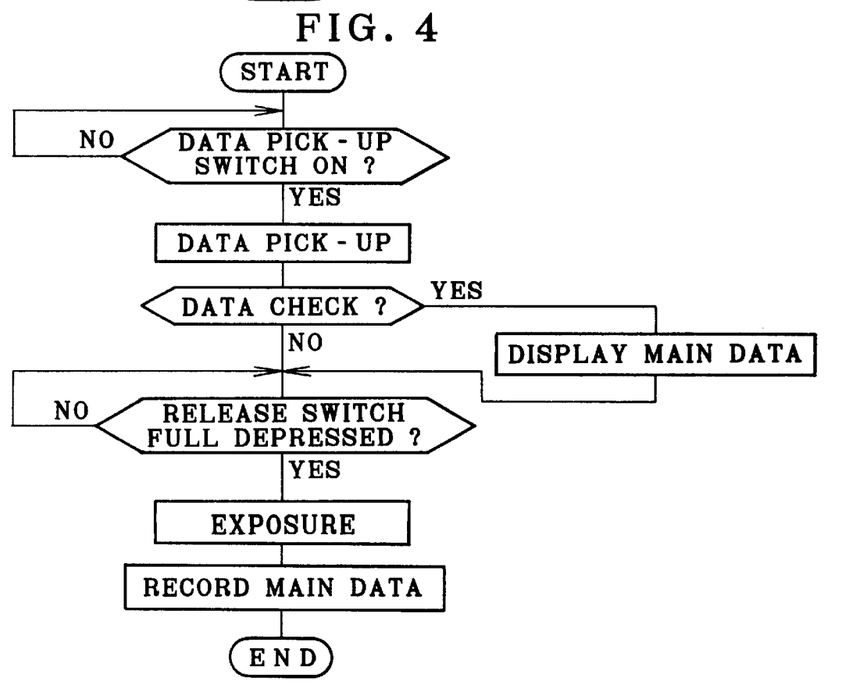
FIG. 4 is a flow chart illustrating a sequence for a manual data pick-up mode.

When the manual data pick-up mode is selected, the CPU processes and records the main data MD according to a sequence shown in FIG. 4. Upon a manual operation of a data pick-up switch 26d, the CPU receives the data signal from the data sender 10, and writes the scene data in the memory 30. If necessary, the data checking switch 26b is operated to display the contents of the main data MD written in the memory 30, in the same way as in the synchronous data pick-up mode. The audio data MD3, if any, may also be checked by operating the audio data checking switch 26c. Thereafter when an exposure is made upon a full depression of the release switch 26a, the main data MD is recorded along with other photo data on the magnetic recording layer of the filmstrip as being advanced one frame after the exposure.

Figure 5:
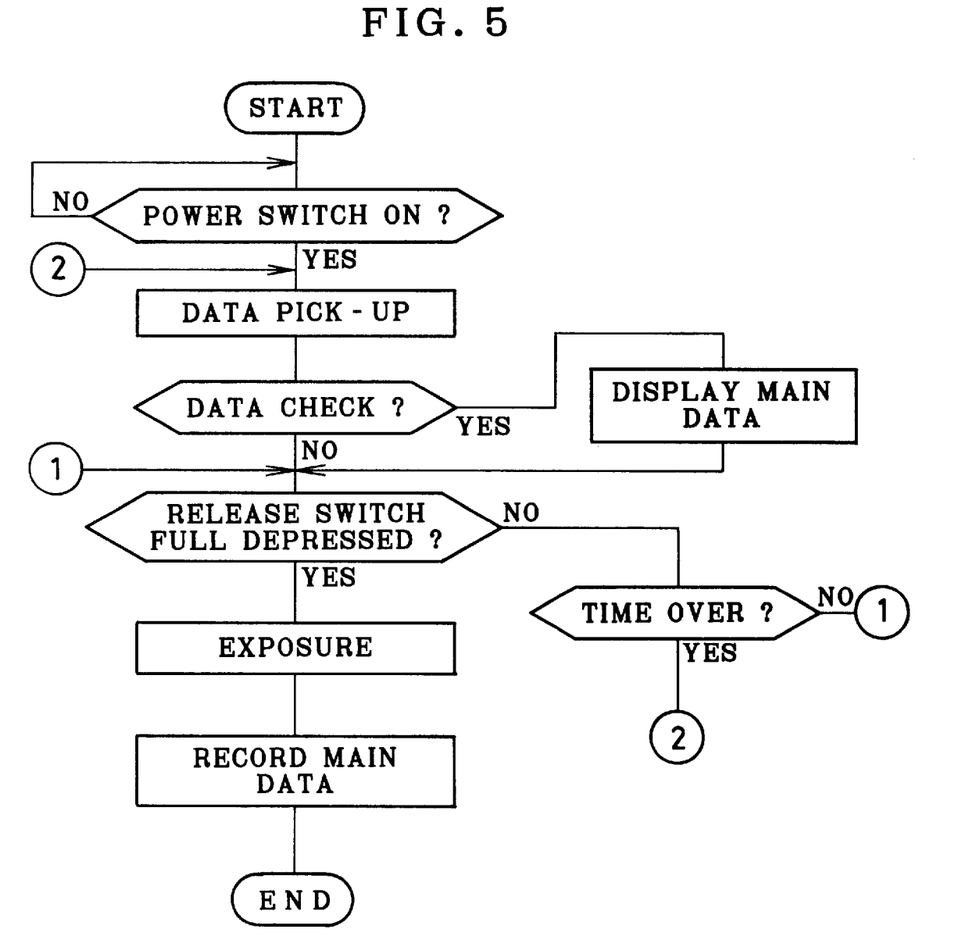
FIG. 5 is a flow chart illustrating a sequence for an automatic data pick-up mode.

When the automatic data pick-up mode is selected, the CPU processes and records the main data MD according to a sequence shown in FIG. 5. Responsive to power switch (not shows) being turned on, the CPU receives the data signal from the data sender 10, and writes the scene data in the memory 30. When the data checking switch 26b is operated, the contents of the main data MD written in the memory 30 are displayed on the screen 24a. The audio data MD3, if any, may also be checked by operating the audio data checking switch 26c. When an exposure is made upon a full depression of the release switch 26a, photo data including the main data MD is recorded on the magnetic recording layer of the filmstrip while the filmstrip is advanced one frame after the exposure. The main data MD in the memory 30 is automatically rewritten with newly received data at regular intervals, e.g. every 10 seconds, unless the release switch 26a is fully depressed to make an exposure.

Also in the manual data pick-up mode or in the automatic data pick-up mode, the photographer can eliminate those data items which are not wanted by designating the number of the data item to eliminate while the main data MD is displayed.

The filmstrip having the scene data and photo condition data recorded in association with the exposed frames is developed in a conventional manner. The developed filmstrip is subjected to a reception process. In the reception process, some commands designating the way of printing the main data are added to the photo data recorded by the camera 20. For example, the commands include whether the title data MD1 is to be printed, whether the explanation data MD2 is to be printed, and whether the audio data MD3 is to be recorded on the finished photo print. According to the commands, a print format is designated to the title data MD1 or the explanation data MD2 if such data is to be printed.

In accordance with the print format designated by the commands, the title or the explanation contained in the title data MD1 or the explanation data MD2 is printed in association with the picture. For example, the title is merge-printed in the picture. The title may be printed on a margin outside the picture, or on a backside of the picture. The explanation may be printed on a backside of the picture, or on a memo sheet. An appropriate printer is used for printing the title or the explanation in accordance with the designated print format.

Figure 6A:
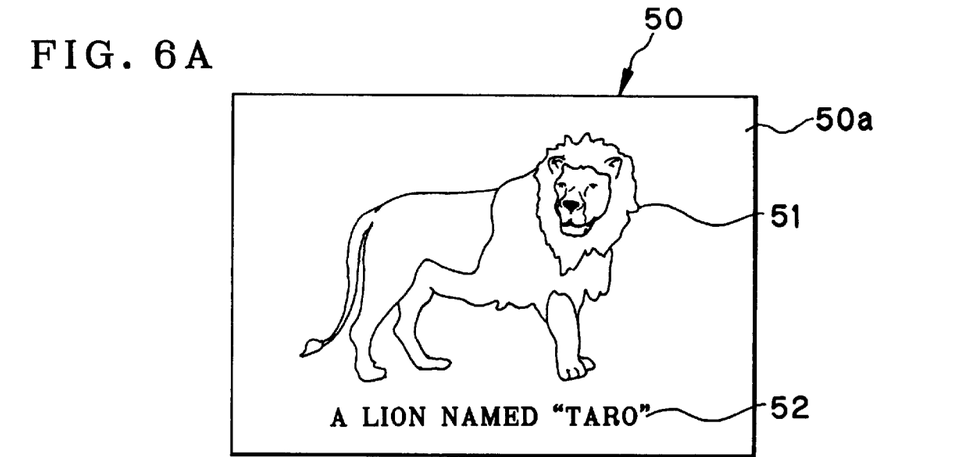
FIGS. 6A, 6B, 6C are schematic views illustrating examples of photo prints made according to the photo data input system of the invention.
Figure 6B:
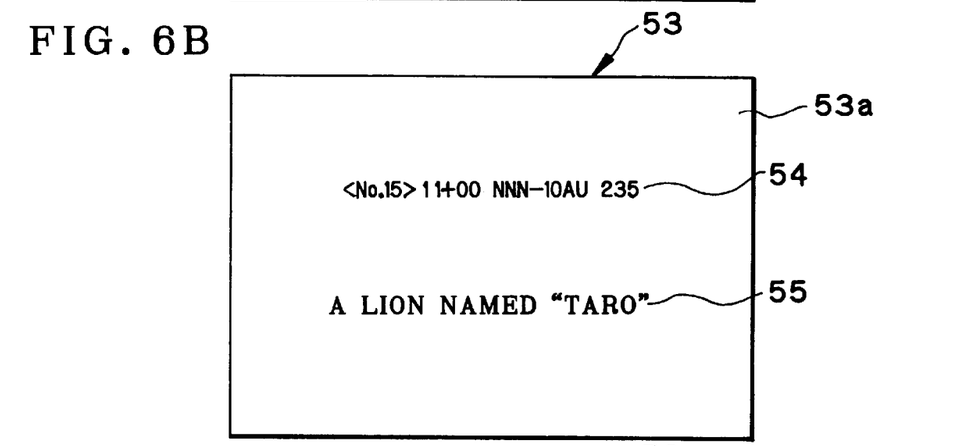
Figure 6C:
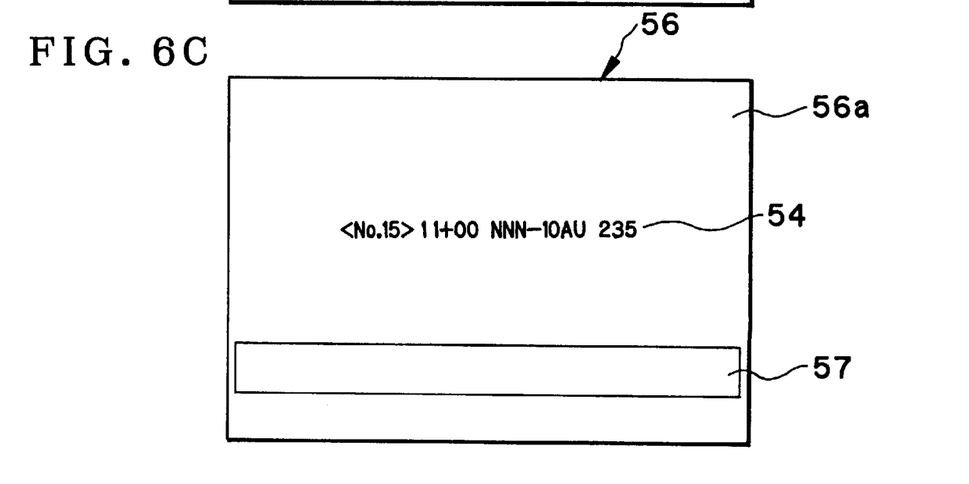

FIG. 6A shows a photo print 50 produced according in the above described way, wherein a picture 51 and a title 52 are photo-printed on a front side 50a of the photo print 50. FIG. 6B shows a photo print 53 having a title 55 and photo condition data 54 including the frame number and the exposure correction data recorded on the backside 53a thereof. FIG. 6C shows a photo print 56, wherein a magnetic recording tape 57 having the audio data MD3 recorded in an appropriate format thereon is adhered to the backside 56a besides photo condition data 54 being printed on the backside 56a. In place of the magnetic recording tape 57, it is possible to provide a magnetic recording layer on the backside of photo paper, to record the audio data MD3 thereon. The sound recorded as the audio data MD3 on the photo print 56 may be reproduced through an audio player having a specific magnetic reading device. Instead of the magnetic recording, it is possible to record the audio data MD3 as a bar code on the photo print.

Figure 7:
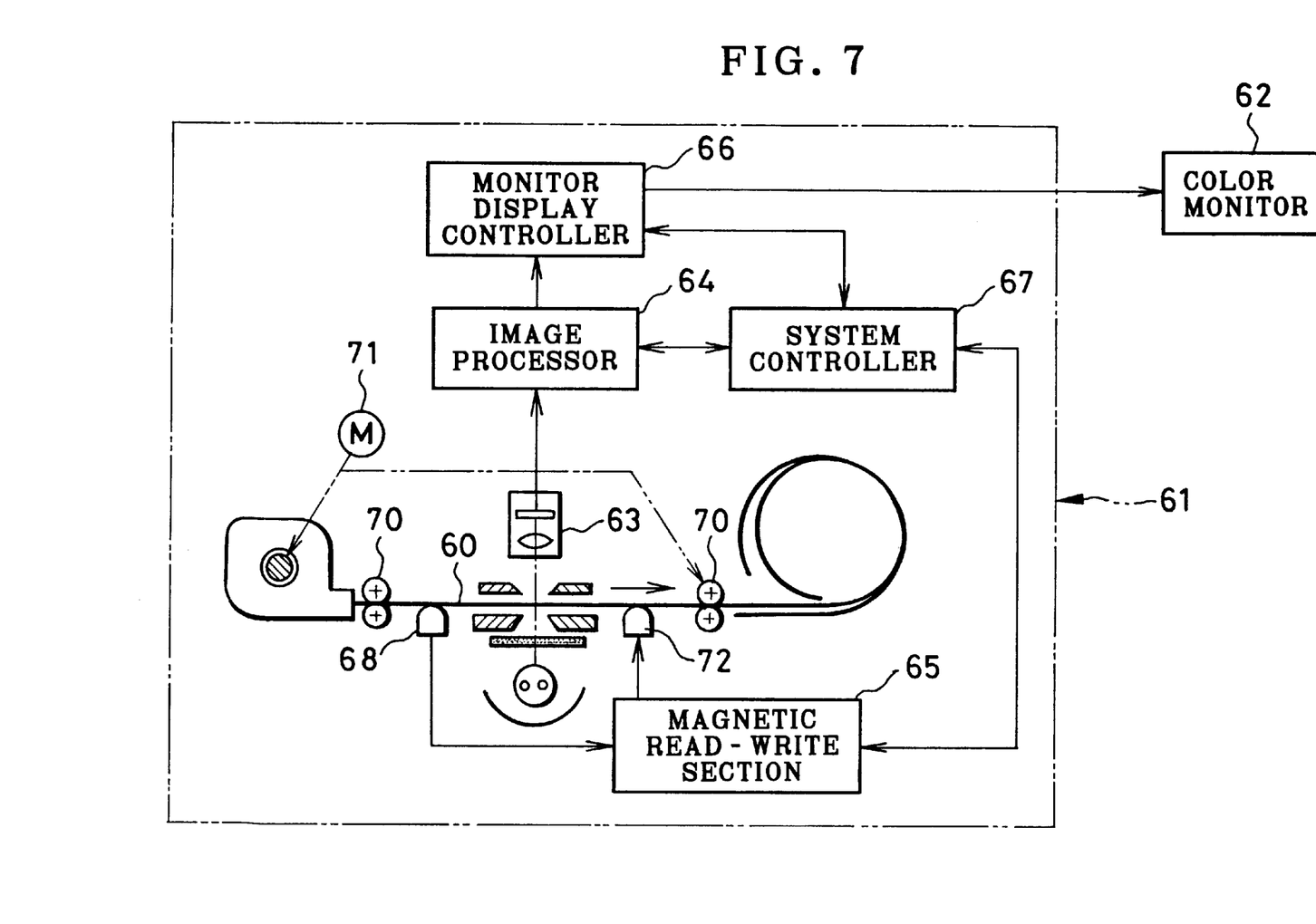
FIG. 7 is a schematic views illustrating a photo player for use with the photo data input system of the invention.

A photo filmstrip 60 having the scene data and photo condition data recorded in association with the exposed frames may be set in a photo player 61 as shown in FIG. 7. The photo player 61 is designed to pick up image data from the frame or frames on the filmstrip 60, and send the image data to a color monitor 62, such as a home TV, for displaying the image of each frame on the color monitor 62. The photo player 61 is constituted of a scanner 63, an image processor 64, a magnetic read-write section 65, a monitor display controller 66 and a system controller 67.

The scanner 63 scans each frame on the filmstrip 60 to pick up image data. The image processor 64 processes the image data to be useful for displaying an image on the color monitor 62 through the monitor display controller 66. The magnetic read-write section 65 reads the main data MD from the transparent magnetic recording layer of the filmstrip 60 through a magnetic reading head 68. From the title data MD1 included in the main data MD and the image data of an associated frame, the image processor 64 composes an image with a title like the photo print 50 shown in FIG. 6A. The composed image is displayed on the color monitor 62. The filmstrip 60 is advanced out of the cartridge by rotating a spool of the cartridge through a motor 71, and is advanced frame by frame by transport rollers 70 which are also driven by the motor 71. The magnetic read-write section 65 further has a magnetic writing head 72 for recording appropriate data on the magnetic recording layer of the filmstrip 60.

It is possible to display an image composed from the image data and the main data MD on a color monitor connected to a personal computer by combining the personal computer with a film scanner having a magnetic read-write section for the magnetic recording layer of the filmstrip 60. It is also possible to print out a hard copy of an explanation contained in the explanation data MD2 in the same way as ordinary word processor documents, if the explanation data MD2 is processed in the personal computer. A sound recorded as the audio data MD3 may also be played through the personal computer. An image file may be produced from the image data, the character data such as the explanation data and the title data, and the audio data. The image file may be used as an electric album, an image data base, or print data.

Although the main data MD is recorded on the magnetic recording layer of the filmstrip in the above embodiment, it is possible to record the main data MD in an IC memory card attached to the camera. In that case, it is preferable to record index data on the magnetic recording layer in association with each frame, to indicate the data items recorded for that frame in the IC memory card. Instead of the IC memory card, another data recording medium such as a floppy disc or a magneto-optical disc is useful for recording the main data MD.

According to the above embodiment, the data senders 10 are spaced sufficiently away from one another so as to avoid signal interference. For this purpose, lowering the power of the sender is also useful. Where the data senders 10 are to be placed so close to one another that the signal interference is unavoidable, it is possible to differentiate the frequency of the electric wave between the senders. In that case, the electric wave receiver of the camera should be provided with a tuner.

Figure 8:
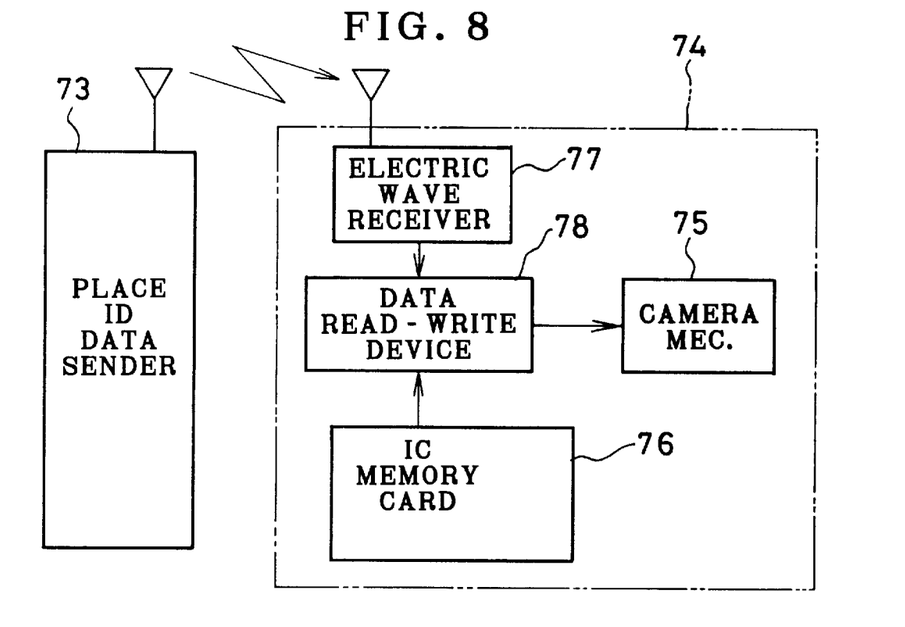
FIG. 8 is a photo data input system according to another embodiment of the invention.

According to another embodiment shown in FIG. 8, a place ID data sender 73 is installed in an appropriate place, instead of the data sender 10. The place ID data sender 73 only sends out place ID data representative of a specific place ID number. On the other hand, a camera 74 is provided with a function to retrieve scene data based on the place ID data. Specifically, the camera 74 is provided with an IC memory card 76, an electric wave receiver 77 and a data read-write device 78 in addition to usual camera mechanisms 75. The IC memory card 76 previously stores various types of scene data, each type being addressed with a place ID number. Based on the place ID data received by the electric wave receiver 77, the data read-write device 78 reads out a corresponding type of scene data from the IC memory card 76, and records it on a data recording medium at the time as scene is photographed.

Figure 9:
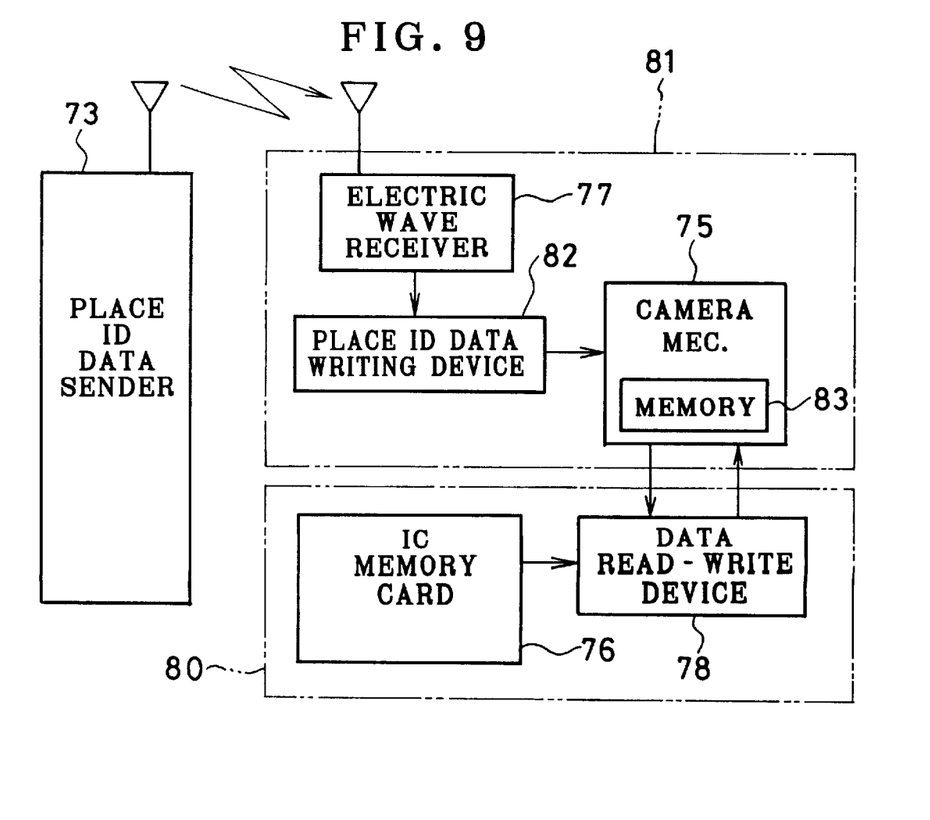
FIG. 9 is a photo data input system according to a third embodiment of the invention.

According to a further embodiment shown in FIG. 9, a scene data writing unit 80 is installed in an appropriate place, e.g. in proximity to an exit of a zoo, whereas the place ID data sender 73 is installed in a place where the frequency or probability of taking photographs is high, e.g. in front of each individual cage in the zoo. The scene data writing unit 80 consists of an IC memory card 76 and a data read-write device 78 which function in the same way as described with respect to the embodiment of FIG. 8. In this embodiment, a camera 81 is provided with a place ID data writing device 82 and a built-in memory 83, so the place ID data writing device 82 writes the place ID data in the built-in memory 83 in association with each frame. Thereafter when the photographer connects the camera 81 to the scene data writing unit 80, the data read-write device 78 reads out the place ID data from the built-in memory 83 of the camera 81, and retrieves corresponding scene data from the IC memory card 76, to record the scene data on magnetic recording tracks of the exposed frames on the filmstrip.

The scene data writing unit 80 may be installed in photo-finishers or reception offices of photo-finishers. In that case, a data base containing a variety of main data in connection with place ID data should be provided so the scene data writing unit 80 is adaptable to a great number of filmstrips which were exposed in various places, e.g. amusement parks, tourist places, expositions, stadia, airports, etc.

In the above embodiment, the scene data contains data relating to the photo subject, such as the name and the history. The scene data may contain photo condition data, such as the type of illumination light source, that is useful for controlling printing conditions.

The photographic data input system of the present invention is applicable not only to cameras for silver-salt film, but also to digital still cameras and video cameras by providing an electric wave receiver in the camera to receive the scene data. The scene data may be recorded by the camera on a magnetic tape, an IC card, a floppy disc, a magneto-optical disc, a digital video disc etc.

Instead of the electric wave, the scene data or the place ID data may be sent out through another type radio or remote communication system, such as infrared or magnetic beams. It is also possible to use cables for sending the scene data. In that case, the camera is connected to the cables through a connector installed in a designated place.

A receiver for receiving the scene data may be provided separately from the camera, so that the camera is connected to the receiver when the photographer wish to record the scene data in association with the photograph.

In order to inform the photographers that the scene data or the place ID data is receivable, an information device should preferably be installed in addition to the data sender. Alternatively, it is possible to provide a display device for displaying when the scene data or the place ID data is being sent out.

In the above embodiment, the data sender always sends out the scene data or the place ID data in a cyclic fashion, and the camera picks up the data at an appropriate time. However, it is possible to design the data sender to send out the scene data or the place ID data in response to a request signal from the camera. The request signal may include item designation commands for designating data items to be recorded by the camera. In that case, the camera should be provided with an operation device for designating data items. This embodiment is preferable in view of energy consumption.

Thus, the present invention should not be limited to the above embodiments but, on the contrary, various modifications may be possible to those skilled in the art without departing from the scope of claims attached hereto.

What is claimed is:

1. A camera comprising:
   a receiver for receiving photo location data sent from a remote terrestrially-located data sender installed at a designated place, said data sender being physically unattached from the camera, wherein the designated place is proximal to where a user of the camera takes a photograph;
   a data storage device operable to store the photo location data in association with an image photographed at the designated place wherein the photo location data includes at least audio information about the designated place and textual information about the designated place, and
   a selector operable by a user for selecting whether each of the photo location data individually will be stored to said data storage device;
   wherein the receiver is operable to receive a low power modulated signal having a signal strength on the order of tens of milliwatts or lower.

2. The camera of claim 1, wherein the receiver is operable in a mode to receive the photo location data continuously in periodic time intervals.

3. The camera of claim 1, wherein the receiver is operable to tune to a plurality of different frequencies depending on the frequency transmitted by the data sender.

4. A camera comprising:
   a receiver for receiving a place ID data from a remote terrestrially-located data sender installed at a designated place, said data sender being physically unattached from the camera, wherein the designated place is proximal to where a user of the camera takes a photograph;
   a memory previously storing various photo data describing subjects to be photographed prior to receiving said place ID data from said data sender, said subjects being in the designated place; and
   a data read-write device for selecting the one of the previously stored photo data corresponding to receiving the place ID data from said data sender and recording the selected photo data on a data storage device related to a subject being photographed at the designated place,
   wherein the receiver is operable to receive a low power modulated signal having a signal strength on the order of tens of milliwatts or lower.

5. A camera as claimed in claim 4, wherein the photo data includes scene data containing at least one of literal and audio information about a subject to be photographed at the designated place.

6. A camera as claimed in claim 4, wherein the data storage device is a magnetic recording layer formed on a filmstrip.

7. A camera according to claim 4, wherein the photo data includes audio information about a subject to be photographed at the designated place.

8. A camera as claimed in claim 4, wherein the recorded selected photo data is related to a particular subject within a scene being photographed.

9. A photo data input system comprising:
   a terrestrially-located data sender installed at a designated place for sending output photo location data, wherein the designated place is proximal to where a user of a camera takes a photograph, the data sender being physically unattached from the camera;
   a receiver for receiving the photo location data from the data sender; and a memory operable to store the photo location data in association with an image photographed by the camera at the designated place, wherein the photo location data includes at least audio information about the designated place and textual information about the designated place, and a selector operable by a user for selecting whether each of the photo location data individually will be stored to said memory;

wherein the sender has a power on an order of tens of milliwatts or lower, to send a low power modulated signal.

10. The camera of claim 9, wherein the receiver is operable in a mode to receive the photo location data continuously in periodic time intervals.

11. The camera of claim 9, wherein the receiver is operable to tune to a plurality of different frequencies depending on the frequency transmitted by the data sender.

12. A photo data input system comprising:
a terrestrially-located data sender installed at a designated place for sending out place ID data; and a camera comprising:
a receiver operable to receive the place ID data from the data sender;
a memory previously storing photo data describing subjects to be photographed prior to receiving ID data from said data sender, said subjects being in the designated place; and
a data read-write device for selecting the one of the previously stored photo data corresponding to receiving the place ID data from said receiver and recording the selected photo data on a data storage device related to a subject being photographed by the camera at the designated place, wherein the receiver receives the place ID data when the designated place and the camera are proximal to each other, and wherein the terrestrially-located data sender is physically unattached from the camera, and
wherein the sender has a power on an order of tens of milliwatts or lower, to send a low power modulated signal.

13. A photo data input system as claimed in claim 12, wherein the memory and the data read-write device are incorporated into the camera.

14. A photo data input system as claimed in claim 12, wherein one of the memory and the data read-write device is incorporated into the camera, whereas the other of the memory and the data read-write device is connectable to the camera.

15. The data input system as claimed in claim 12, wherein the photo data includes scene data containing at least one of descriptive literal and descriptive audio information, said descriptive information describing a subject to be photographed at the designated place.

16. A photo data input system as claimed in claim 12, wherein the data storage device is a magnetic recording layer formed on a filmstrip.

17. A camera according to claim 12, wherein the photo data includes audio information about a subject to be photographed at the designated place.

18. A photo data input system as claimed in claim 12, wherein the recorded selected photo data is related to a particular subject within a scene being photographed.

19. A photo data input system comprising:
a terrestrially-located data sender installed at a designated place for sending out place ID data for providing a description of characteristics of the designated place where the terrestrially-located data sender is installed;
a camera provided with a receiver for receiving the place ID data from the data sender, said data sender being physically unattached from the camera, and a data recording device for recording the place ID data in a first memory related to a subject to be photographed by the camera at the designated place wherein the designated place is proximal to where a user of the camera takes a photograph;
a scene data writing unit comprising:
a second memory previously storing various photo data describing a plurality of the subjects to be photographed prior to the camera receiving ID data from said data sender, said subjects being in the designated place;
a data read-write device connected to the second memory and connectable to the first memory for reading the place ID data from the first memory to select one of said previously stored photo data from the second memory corresponding to receiving the place ID data, the data read-write device recording the selected photo data on a data storage device related to a subject being photographed at the designated place,
wherein the sender has a power on an order tens of milliwatts or lower, to send a low power modulated signal.

20. The data input system as claimed in claim 19, wherein the photo data includes scene data containing at least one of descriptive literal and descriptive audio information, said descriptive information describing a subject to be photographed at the designated place.

21. A camera as claimed in claim 19, wherein the data storage device is a magnetic recording layer formed on a filmstrip.

22. A camera according to claim 19, wherein the photo data includes audio information about a subject to be photographed at the designated place.

23. A photo data input system as claimed in claim 19, wherein the recorded selected photo data is related to a particular subject within a scene being photographed.

* * * * *